United States Patent
Van Driel et al.

(10) Patent No.: US 6,320,869 B1
(45) Date of Patent: Nov. 20, 2001

(54) TELECOMMUNICATION NETWORK WITH IMPROVED ACCESS PROTOCOL

(75) Inventors: Carel J. L. Van Driel; Petrus A. M. Van Grinsven, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/634,596

(22) Filed: Apr. 24, 1996

(30) Foreign Application Priority Data

May 4, 1995 (EP) .................................................. 95201154

(51) Int. Cl.$^7$ ....................................................... H04J 3/14
(52) U.S. Cl. ............................................. 370/443; 370/461
(58) Field of Search .................................... 370/329, 348, 370/443, 449, 461, 470, 474, 476, 468, 465, 431, 458, 462, 463; 455/509, 510, 433, 437, 443, 444, 458, 461, 462, 470

(56) References Cited

U.S. PATENT DOCUMENTS

| | | | |
|---|---|---|---|
| 4,646,345 | * | 2/1987 | Zdunek et al. ........................ 455/509 |
| 4,999,835 | | 3/1991 | Lagoutee . |
| 5,327,432 | | 7/1994 | Abedeen et al. . |
| 5,384,777 | * | 1/1995 | Ahmadi et al. ....................... 370/337 |

OTHER PUBLICATIONS

"Network Evolution for End User Access to Interactive Digital Services", By C.J.L. Van Driel et al, "The Last Mile of the Information Superhighway", IBC Conference, Sydney, Aug. 1994.
"Computer Networks", By A.S. Tanenbaum, Prentice–Hall, 1989, ISBN 0–13–166836, pp. 130–131.

* cited by examiner

Primary Examiner—Huy D. Vu
(74) Attorney, Agent, or Firm—Russell Gross

(57) ABSTRACT

A telecommunication network including a plurality of secondary stations and a primary station wherein the secondary stations a least partially share a common transmission channel to the primary station, thus obtaining high data transmission efficiency under high load conditions. To prevent interference, an access protocol is employed according to which all secondary stations which have data to transmit send transmission request signals to the primary station. The primary station then transmits to those secondary stations an allocation signal assigning respective time slots to them. The secondary stations then transmit in their assigned time slots. Directly upon completion of transmission in its assigned time slot a secondary station transmits a further transmission request signal to the primary station it such secondary station still has further data to transmit.

16 Claims, 3 Drawing Sheets

TELECOMMUNICATION NETWORK WITH IMPROVED ACCESS PROTOCOL

BACKGROUND OF THE INVENTION

1. Field of the Invention

The invention relates to a telecommunication network comprising a primary station and a plurality of secondary stations, the secondary stations being linked to the primary station via a transmission medium which is at least partly in common for a number of secondary stations.

The invention also relates to stations for use in such network and to a communication method for such networks.

2. Description of the Related Art

A telecommunication network according to the preamble is known from the conference paper "Network Evolution for End User Access to Interactive Digital Services" by C.-J. L. van Driel and W. A. M. Snijders, Proceedings of "The Last Mile of the Information Superhighway", IBC conference, Sydney, August 1994.

Such telecommunication networks are used for communication between several secondary stations and a primary station, via a transmission channel being, at least partially, common to some of the secondary stations. Such transmission channel can comprise an optical fibre, a coaxial cable, or a radio link. Application of such transmission systems can be passive optical networks, cable TV systems, local area networks, systems for satellite communication and mobile radio systems.

In transmission systems utilising a common channel for some secondary stations it must be ensured that no interference is caused by secondary stations simultaneously transmitting information to the primary station. However, to ensure an adequate service for the secondary stations, it is also required that efficiency of the data transport over the network be high, particularly under heavy load conditions.

There exist various different access protocols, such as Aloha and slotted Aloha, for such type of networks. However these protocols suffer from a very low efficiency under heavy load conditions.

SUMMARY OF THE INVENTION

It is an object of the present invention to provide a telecommunication network according to the preamble having a high efficiency under high load conditions.

Therefor the telecommunication network is characterised in that the secondary stations comprise request transmitting means for transmitting a transmission request signal to the primary station, the primary station comprises allocation transmitting means for transmitting an allocation signal to the secondary stations in response to transmission request signals received, the secondary stations comprise payload transmitting means for transmitting in response to the allocation signal payload data in turn to the primary station, and the request transmitting means are arranged to transmit a transmission request signal to the primary station immediately after transmission of payload data by the secondary stations.

By having the secondary stations which have payload data to be transmitted to the primary station to transmit a transmission request signal, the primary station is informed of the secondary stations which have payload data for the primary station. Thereafter the primary station transmits to the secondary stations an allocation signal indicating timeslots they may use. Subsequently the secondary stations transmit their payload data to the primary station in the timeslots assigned to them. After the transmission of payload data by a secondary station has been completed, the secondary station transmits its next request signal for the next transmission cycle if it has further data to transmit. It is also conceivable that the next transmission request signals are transmitted after a predetermined amount of payload data has been transmitted by the secondary stations. This can lead to more efficient operation, because it is not required that all the secondary stations have to wait for the allocation signal before transmitting their payload data.

Under high load conditions the transmission path from secondary stations to the primary station will be mostly filled with payload data from the secondary stations, leading to a high efficiency.

An additional advantage is that the delay a substation encounters when it wishes to transmit data to the primary station is bounded to some maximum value. This is because the substations transmitting a transmission request signal are granted a timeslot shortly thereafter. The actual transmission interval available for each secondary station depends on the transmission load of the network.

It is observed that the book "Computer Networks" by A. S. Tanenbaum, published by Prentice-Hall, 1989, ISBN 0-13-166836-6 pp 130–131 discloses a protocol having a high efficiency under heavy load conditions, and having a upperbound to the delay. However in this protocol there is no primary station which receives transmission request signals from the secondary stations and issues allocation signals to them.

A further embodiment of the invention is characterised in that the request transmitting means of a secondary station are arranged for transmitting the transmission request signal during a timeslot associated to said secondary station.

An easy way of distinguishing the transmission request signals from different secondary stations is associating a particular timeslot to said secondary station wherein said secondary station has to transmit its transmission request signal.

A further embodiment of the invention is characterised in that the allocation transmitting means are arranged for transmitting the transmission request signals as received by the primary station, as an allocation signal.

Retransmission of the received transmit request signals as an allocation signal is a simple way of providing an allocation signal. The secondary station receiving said allocation signal then know all the other secondary stations that have payload data to be transmitted to the primary station. Having this information they can determine a time slot number they can transmit in. This can for example be done by allowing transmission by the secondary stations in an order determined by a rank number associated with each of the secondary stations.

A further embodiment of the invention is characterised in that the payload transmitting means are arranged for transmitting in a predetermined number of symbol intervals a integer plurality of short information cells, or one single synchronous transfer mode cell.

Arranging the payload transmission means for transmitting a number of short information cells or one single ATM cell results in a network allowing the transmission of several types of signals during one predetermined time interval. This is advantageous for higher level protocols that only have to cope with one predetermined time interval of transmission by each secondary stations.

A first choice for the size of the short information cells is characterised in that the short information cells have a size of sixteen bytes, and in that the predetermined number of short information cells is equal to four. Using four short information cell of 16 bytes results in 64 bytes in total, which can also carry one ATM cell (53 bytes) plus some additional overhead information.

A second choice for the size of the short information cells is characterised in that the short information cells have a size of nine bytes, and in that the predetermined number of short information cells is equal to six. Using six short information cell of 9 bytes results in 54 bytes in total, which can also carry one ATM cell (53 bytes) plus one additional overhead byte.

BRIEF DESCRIPTION OF THE DRAWINGS

For a fuller understanding of the invention, reference is had to the following description taken in connection with the following drawings, in which.

DETAILED DESCRIPTION OF THE PREFERRED EMBODIMENTS

Figure 1:
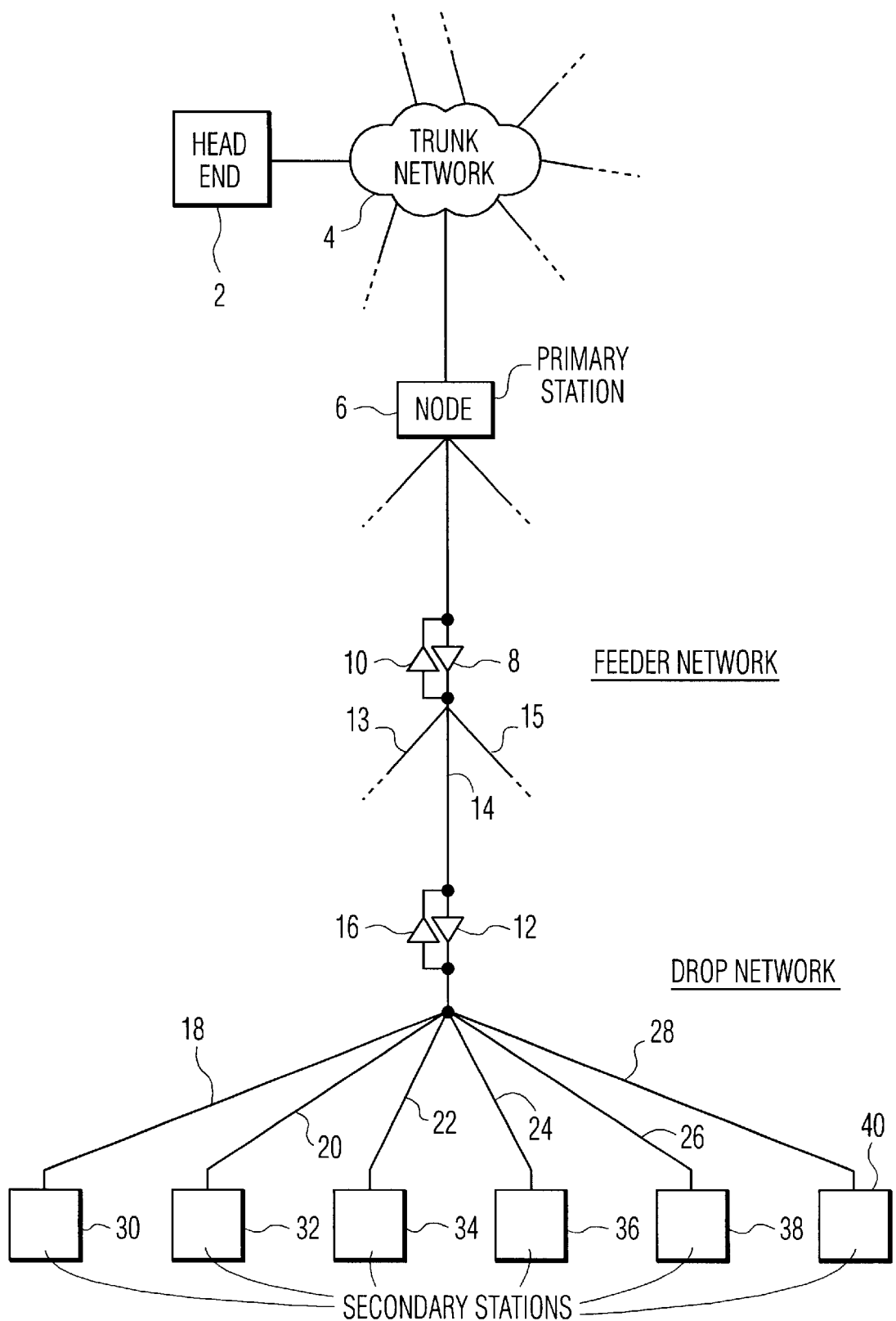
FIG. 1, a two-way cable network in which the invention can be applied.

In the cable network according to FIG. 1 a head end 2 is connected via a trunk network 4 to a primary station, being here a local node 6, and to several other primary stations. An input/output of the primary station 6 is connected with an input of a forward path amplifier 8 and to an output of a return path amplifier 10. The output of the forward path amplifier 8 and the input of the return path amplifier 10 are connected to a plurality of feeder cable sections 13 14 and 15. The feeder cable section 14 is connected to an input of a forward path amplifier 12 and to an output of a return path amplifier 16. The output of the forward amplifier 12 and the input of the return path amplifier 16 is connected to drop cable sections 18, 20, 22, 24, 26 and 28, which drop cable sections are connected to secondary stations 30, 32, 34, 36, 38 and 40.

The cable network according to FIG. 1 basically consists of three sections: the trunk network, the feeder network and the drop network. The trunk network 4 is arranged for connecting the head end 2 to the local nodes. Optical fibre is often used in the trunk network 4, but also coaxial cable can be used in the trunk network 4. If the cable network has to serve a large area, the use of optical fibres in the trunk network can result in substantially lower costs.

Each local node is arranged for serving 100–1500 secondary stations. The forward path amplifier 8 and the return path amplifier 10 are arranged to have non overlapping pass bands in order to prevent instability. Currently the pass band of the return path amplifiers is from 5 MHz to 42 MHz, and the pass band of the forward path amplifiers is from 55 to 750 MHz. The output signal of the amplifier 8 is split into signals for the feeder cable sections 13, 14 and 15. The upstream signals from the feeder cable sections 13, 14 and 15 are combined to an input signal for the return path amplifier 10. The signal from feeder cable section 14 is amplified in the forward path amplifier 12, and distributed to the secondary stations 30 . . . 40 via the drop cable sections 18 . . . 28. The signals from the secondary stations is transmitted via the drop cable sections 18 . . . 28 and combined at the input of the return path amplifier 16.

To prevent mutual interference between upstream signals several techniques are used. In general a plurality of upstream carriers in the return frequency range from 5–42 MHz are used, each of them having N secondary stations allocated to them. To prevent interference between the upstream signals sent by the N secondary stations an access protocol according to the invention is applied.

It is conceivable that the primary station is not the local node 6, but that all the functions of the primary station are concentrated in the head end 2. The trunk network 4 then has to be arranged for passing the upstream signals arriving at the local nodes to the head end 2.

Figure 2:
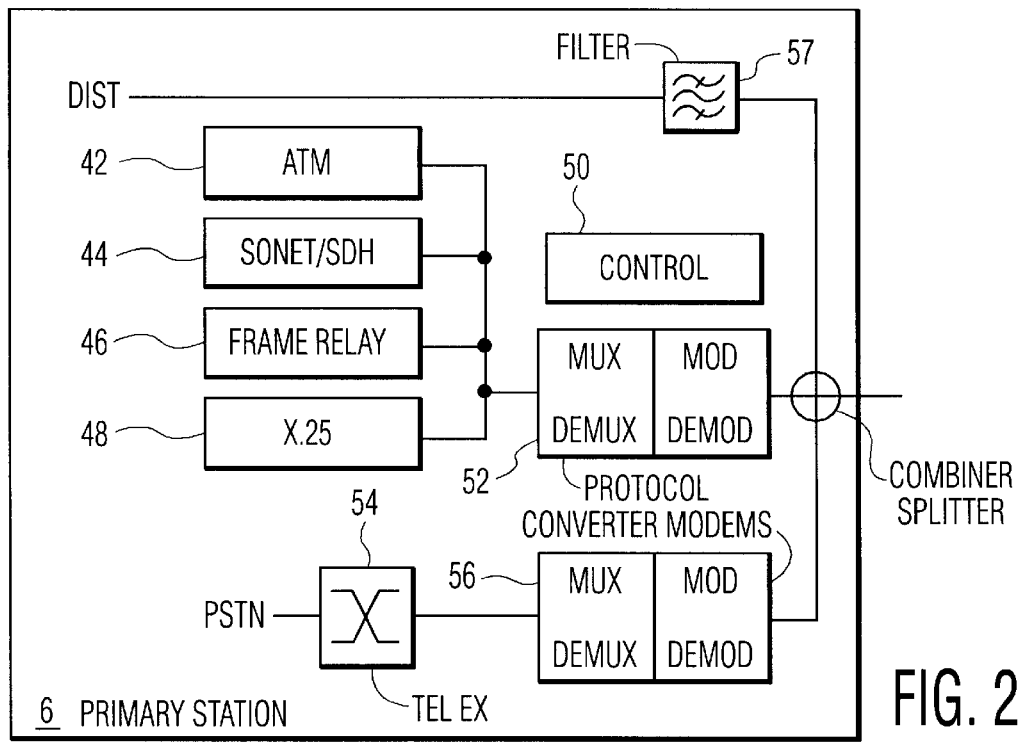
FIG. 2, a primary station for use in a network according to FIG. 1.

In the local node 6 according to FIG. 2, a wide band distribution signal is applied to a first port of a signal combiner/splitter 58 via a band pass filter 57. An ATM gateway 42, A SONET/SDH gateway 44, a Frame Relay gateway 46, and an X.25 gateway 48 are connected to a protocol converter/modem 52. The protocol converter/modem 52 is connected to a second port of the combiner/splitter 58. A telephone exchange 54 is coupled to the PSTN network and to a protocol converter/modem 56. The protocol converter/modem 56 is coupled to a third port of the combiner/splitter 58. An input/output of the combiner/splitter 58 constitutes the input/output of the local node 6.

The local node 6 is arranged to provide different types of services to the secondary stations. A distribution signal as received from the head end via the trunk network 4 is applied directly to the combiner/splitter 58. The distribution signal mainly comprises a plurality of TV signals modulated on respective carriers in the 55–750 MHz band.

The gateways 42, 44, 46 and 48 are arranged to interface the cable network to a public ATM network, a public SONET/SDH network, a frame relay network and an X.25 network respectively. Data signals to be transmitted via the gateways 42 . . . 48 are received from the feeder cable sections, demodulated and converted into the desired protocol by the protocol converter/modem 52. Data signals received from the gateways 42 . . . 48 are converted into the format used on the cable network and modulated on a carrier by the protocol converter/modem 52.

The transmission request signals received from the secondary stations are detected by the protocol converter/modem 52 and passed to the control unit 50. After having processed the transmission request signals, the control unit 50 passes the allocation signal to the protocol converter/modem 52 which multiplexes the allocation with the payload data received from the gateways 42,44,46 and 48. The multiplexed signal is modulated on a carrier by the protocol converter/modem 52 for transmission to the secondary stations. Here the allocation transmission means are constituted by the combination of the protocol converter/modem 52 and the control unit 50.

A telephone exchange 54 is present for interconnecting telephone calls between secondary stations in the cable network. A protocol converter/modem 56 is arranged for interfacing the cable network to the telephone exchange. The telephone exchange 54 is connected to the public telephone network for enabling calls to be made outside the cable network by the secondary stations.

Figure 3:
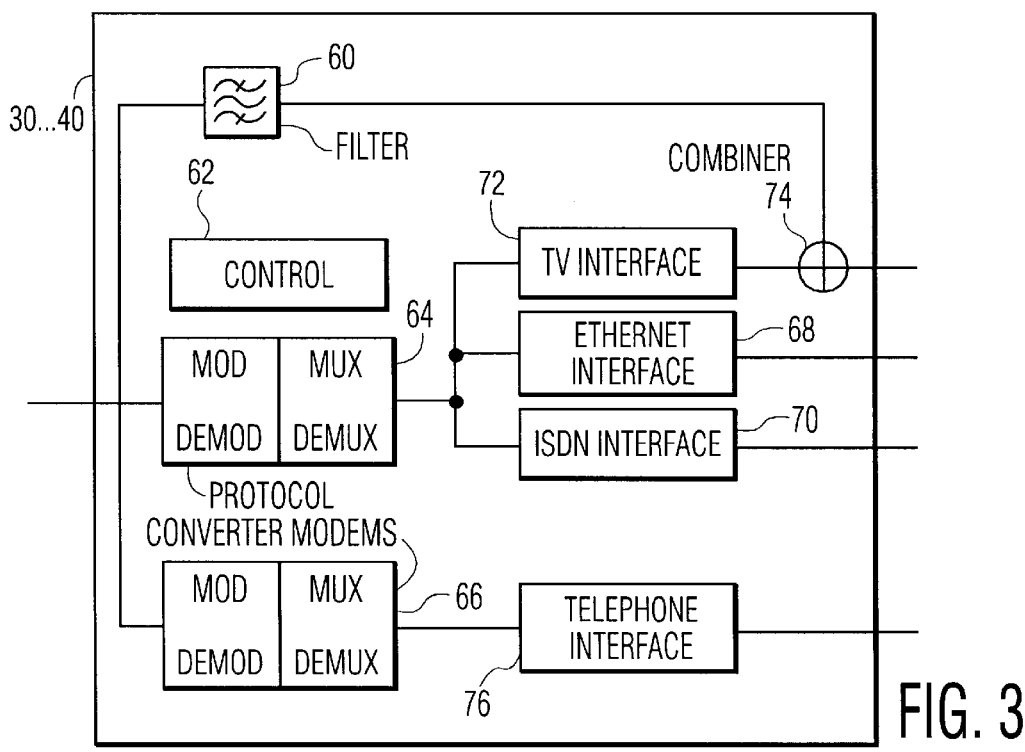
FIG. 3, a secondary station for use in a network according to FIG. 1.

In the secondary station 30 . . . 40 according to FIG. 3 a drop cable section is connected to an input of a band pass filter 60, to a protocol converter/modem 64 and to a protocol converter/modem 66. The primary station or protocol converter modem 64 is connected to a TV interface 72, an Ethernet interface 68 and an (narrow band) ISDN interface 70. The output of the band pass filter 60 and the output of the TV interface are connected to a signal combiner 74. The output of the protocol converter/modem 66 is coupled to a telephone interface 76.

In the secondary station according to FIG. 3, the distribution signal to be applied to a TV receiver is extracted from the input signal received from the drop cable section. Said distribution signal is coupled via the bandpass filter 60 to the combiner 74, where it is combined with control signals from the TV interface 72 for a set top box. Such control signals can e.g. comprise a key for decrypting an encrypted video signal, in order to enable reception of said video signal by authorised users only.

The output of the Ethernet interface 68 provides a connection for one or more PC's. The output of the ISDN interface can be connected to a ISDN telephone or to a videophone terminal. Finally the telephone interface 76 provides access to the network for an analog telephone set. It is observed that not all possibilities as discussed have to be realised in the primary and/or secondary stations.

The request transmission means are constituted by the combination of protocol converter/modem 64 and control unit 62, and the payload transmission means are constituted by the combination of protocol converter/modem 64, control unit 62 and the active interface from among the interfaces. The control unit 62 detects whether there is data to be transmitted by one of the interfaces. If so the control unit 62 submits a transmission request signal to the protocol converter/modem 64 which passes said signal to its modulator which switches on a carrier at the correct instant for transmission to the primary station. The protocol converter/modem 64 recognises an allocation signal received by the secondary station, and passes it to the control unit 62. After some processing, the control unit 62 initiates the transmission of payload data by the protocol converter/modem 64 to the primary station.

Figure 4:
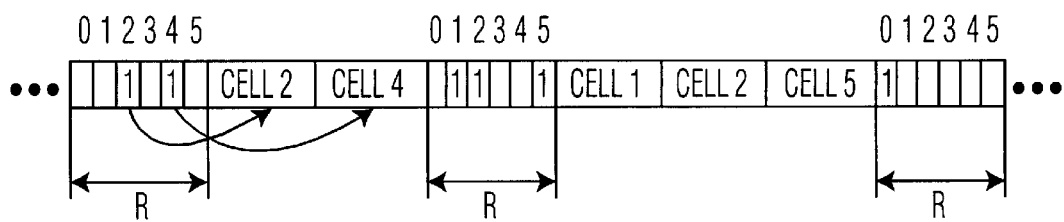
FIG. 4, a conceptual drawing of the access protocol according to the invention.

In FIG. 4 the access protocol to be used by the secondary station to access the common channel is presented. According to the inventive concept the secondary stations are each provided with means for transmitting request signals indicating that said secondary station has data to be transmitted. The request transmitting means are incorporated in the protocol converter/modem 64 in FIG. 3. In FIG. 3 it can be seen that there is a request cell R in which the secondary stations can transmit their transmission request signal. The request interval is subdivided into M sub-slots, where $M \leq N$. To each of the N secondary stations one unique sub-slot is allocated, so that every secondary station is able to signal that it has data to be transmitted.

In the analysis to follow all durations are expressed in symbol periods, a symbol period being the time required for transmitting one basic symbol. To signal that a secondary station has data to transmit, it switches on a carrier in its subslot. If it is assumed that the switching time is $g_s$ symbols, and the time to detect the carrier in the primary station is equal to $d_{ss}$ symbols, the duration of the sub-slot $S_{ss}$ has to be at least equal to:

$$S_{ss} = d_{ss} + 2g_s \quad (1)$$

If the duration of a request cell is $S_{mc}$ symbols, the number of sub-slots M in a request cell is equal to:

$$M = \left\lfloor \frac{S_{mc}}{S_{ss}} \right\rfloor \quad (2)$$

It is further assumed that all payload data is transmitted using an info-cell which comprises a number of V of mini cells. It is assumed that the request cell has the same duration $S_{mc}$ as a minicell.

After the request cell has been filled with request signals from the various secondary stations, all the secondary stations that have transmitted a transmit request signal are enabled in turn to transmit an information cell to the primary station. This enabling takes place $W_0$ mini cells after the request cell has ended. If a secondary station i is the only station having transmit a transmit request signal, the info-cell of said station can be transmitted $W_0$ symbol periods after the request cell has ended. If all secondary stations having a rank number lower than i have submitted a transmit request signal secondary station i can transmit its info-cell $W_0 + iV$ symbol periods after the request cell has ended.

If the $i^{th}$ secondary station wants to submit a transmit request, it might just have missed its sub-slot in the request cell. In that case there are a maximum of $S_{mc} - i$ sub-slots in the request cell left. If the number of mini-cells between two request cells is limited to $W_1$, one obtains for the upper bound to the delay $D_i$ of the payload data from secondary station i:

$$D_i = S_{mc} - iS_{ss} + W_1 S_{mc} + W_0 S_{mc} + iVS_{mc} \quad (3)$$

In (3) it is assumed that at least i info-cells are available between two request cells. This condition can be expressed as $i+1 \leq (W_1 - w_0)/V$. (3) can also be written as:

$$D_i = S_{mc}\left(2 + W_1 + W_0 + i \cdot \left(V - \frac{S_{ss}}{S_{mc}}\right)\right) \quad (4)$$

If $i+1 > (W_1 - w_0)/V$ an extra request cell is present because the last info-cells indicated by the first request cell are transmitted in the period $W_0$ after the second request cell. This results in an upper bound on the delay being equal to:

$$D_i = S_{mc}\left(3 + W_1 + W_0 + i \cdot \left(V - \frac{S_{ss}}{S_{mc}}\right)\right) \quad (5)$$

By neglecting $S_{ss}/S_{mc}$ the upper bounds according to (4) and (5) can be simplified:

$$D_i = S_{mc}(2 + W_1 + W_0 + iV); i+1 \leq \frac{(W_1 - W_0)}{V} \quad (6)$$

$$D_i = S_{mc}(3 + W_1 + W_0 + iV); i+1 > \frac{(W_1 - W_0)}{V} \quad (7)$$

If the number N of secondary stations is larger the number of transmission requests that can be transmitted in one mini-cell, the number of request cells has to be increased to a number $\lceil N/M \rceil$. This means that to the value of $W_1$ a value $\lceil N/M \rceil - 1$ has to be added. For the upper bound $D_{max}$ for the delay can now be derived by substituting the new value for $W_1$ in (7):

$$D_{max} = S_{mc}\left(2 + V + 2NV + \left\lceil \frac{N}{M} \right\rceil\right) \quad (8)$$

It is observed that (8) is also valid for $N \leq M$ because in that case $\lceil N/M \rceil$ is equal to 1 and $W_1$ assumes its original value.

The efficiency E of the system can be calculated very easily. Under low load conditions one request cell per info-cell is required. This results in:

$$E_{low} = \frac{VS_{mc}}{S_{mc} + VS_{mc}} = \frac{V}{1+V} \quad (9)$$

Under high load conditions all N secondary stations will be submitting transmit request signal continuously, resulting into N info-cells between two subsequent request cells. For the efficiency $E_{high}$ then is found:

$$E_{high} = \frac{NVS_{mc}}{S_{mc} + NVS_{mc}} = \frac{NV}{1+NV} \quad (10)$$

Consequently the efficiency E is bounded between:

$$\frac{V}{1+V} \leq E \leq \frac{NV}{1+NV} \quad (11)$$

Using (8) and (11) the delay and the efficiency of the return channel can be calculated for different values of $S_{mc}$, V, $W_0$ and N. The results of said calculation are presented in the table given below. It is further observed that a modulation scheme is used enabling the transmission of two bits per symbol.

| load | N | $S_{mc}$ | $S_{ss}$ | V | $W_0$ | $W_1$ | E | $R_{ch}$ | $R_{station}$ | $D_{max}$ |
|---|---|---|---|---|---|---|---|---|---|---|
| high | 8 | 64 | 8 | 4 | 8 | 32 | 97% | 2 Mb/s | 248 kb/s | 3.3 ms |
| low | 8 | 64 | 8 | 4 | 8 | 32 | 80% | 2 Mb/s | 1.6 Mb/s | |
| high | 288 | 64 | 8 | 4 | 8 | 1979 | 97% | 2 Mb/s | 8 Mb/s | 109 ms |
| low | 288 | 64 | 8 | 4 | 8 | 1979 | 6% | 2 Mb/s | 120 Mb/s | |
| high | 18 | 36 | 2 | 6 | 12 | 108 | 99% | 2 Mb/s | 113 Mb/s | 6.2 ms |
| low | 18 | 36 | 2 | 6 | 12 | 108 | 86% | 2 Mb/s | 1.7 Mb/s | |
| high | 288 | 36 | 2 | 6 | 12 | 2957 | 99% | 2 Mb/s | 8 Mb/s | 107 ms |
| low | 288 | 36 | 2 | 6 | 12 | 2957 | 18% | 2 Mb/s | 372 Mb/s | |

In the case where V is equal to 4 and $S_{mc}$ is equal to 64, a mini-cell can carry 16 bytes and an information cell or request cell can carry 64 bytes. This is sufficient for carrying one ATM cell (53 bytes) plus some additional overhead. If only one request cell is used and if $S_{ss}$ is equal to 8, the maximum value of N is 8. By using a plurality of mini-cells which can comprise an ATM packet is possible to have a system that can use mini-cells for carrying voice related data having a low transmission delay, and which can also transmit ATM cells having a larger transmission delay.

In the case where V is equal to 6 and $S_{mc}$ is equal to 36, a mini-cell can carry 18 bytes and an information cell or request cell can carry 54 bytes. This is sufficient for carrying one ATM cell (53 bytes) plus one additional overhead byte. If only one request cell is used and if $S_{ss}$ is equal to 2, the maximum value of N is 18.

In the case N is equal to 288 the number of request cells has to be increased in the first case to 36. In the second case the number of request cells has to be increased to 18. From the table it can clearly be seen that the efficiency under high load is excellent for all cases. It can also be seen that the delay has a maximum value of approximately 100 ms, which is acceptable for most applications.

Figure 5:
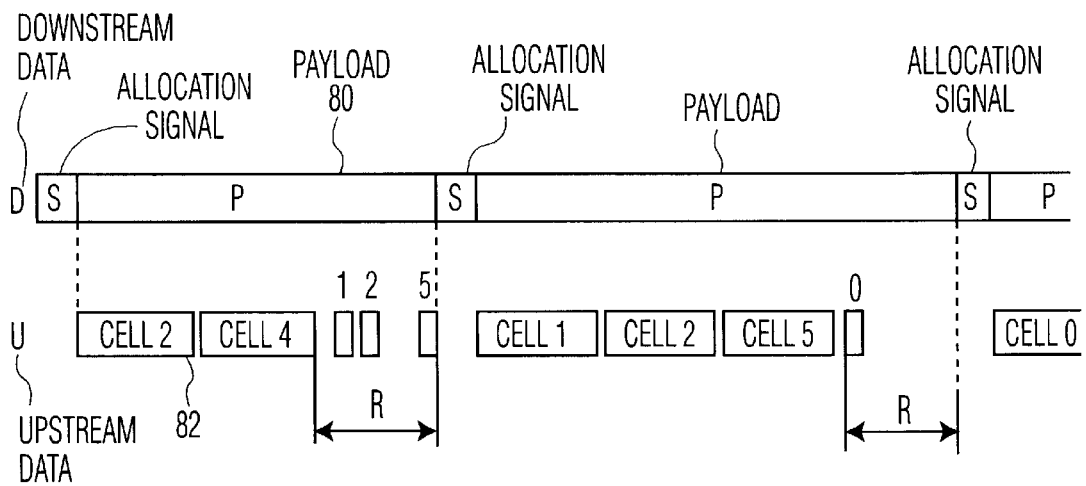
FIG. 5, upstream and downstream signals in the network according to FIG. 1 using the protocol according to the invention.

FIG. 5 shows a first possibility of the relation between the downstream data D and the upstream data U. From FIG. 5 it can be seen that the secondary stations start with transmitting their info-cells in turn after the allocation signal S has been received from the head-end. Hereby is a cell indicated with CELL i, in which i is an integer number, a cell originated by a secondary station with rank number i. After all secondary stations have transmitted their info-cells, the secondary stations having payload data available transmit a transmission request signal in a corresponding time slot in the request cell. Subsequently the secondary stations wait until the request signals have been processed by the primary station and the allocation signal has been received. Between the subsequent allocation signals, the primary station transmits payload data destined for the secondary stations.

If the processing time of the transmission request signals is too long, this can lead to some efficiency loss of the upstream link due to the waiting time for the allocation signal.

Figure 6:
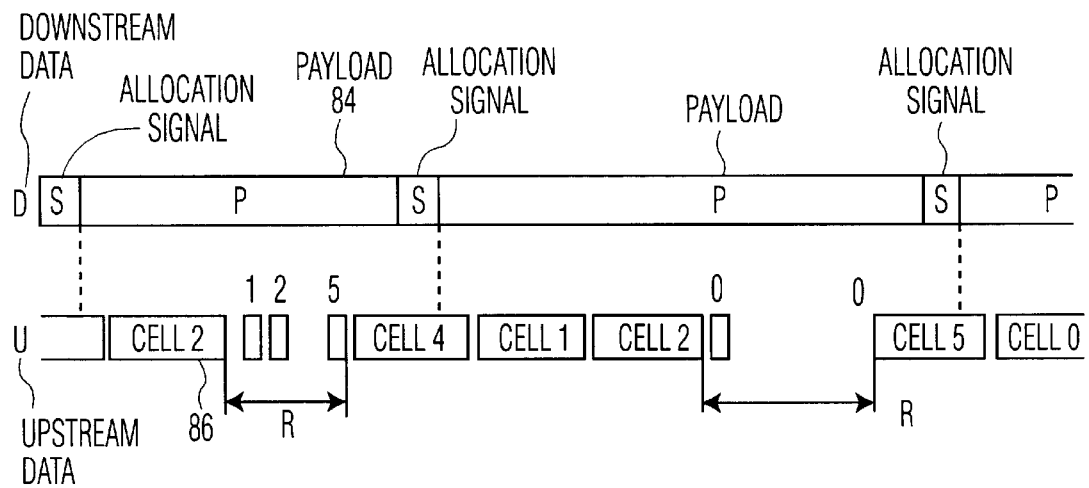
FIG. 6, upstream and downstream signals in the network according to FIG. 1 using the protocol according to the invention, but having a transmission request signals interleaved in the payload data associated with previous request signals.

FIG. 6 shows a solution to said problem. Now the secondary stations are arranged to transmit the transmit request signals in a request cell following the last but one info-cell to be transmitted by the secondary stations. The final info-cell is transmitted direct after the request-cell. In this way the waiting time for the allocation signal does not result in a decreased efficiency of the upstream transport mechanism.

We claim:

1. A telecommunication network comprising a primary station and a plurality of secondary stations, the secondary stations being linked to the primary station by a transmission medium which is at least partly shared in common by the secondary stations; characterized in that:

the secondary stations each comprise request transmitting means for transmitting a transmission request signal to the primary station;

the primary station comprises allocation transmitting means for transmitting an allocation signal to each of the secondary stations from which request signals have been received;

the secondary stations each comprise payload transmitting means which, in response to an allocation signal, transmit payload data from the requesting secondary stations in respective timeslots of equal predetermined duration;

the number of said timeslots being determined by the number of secondary stations which transmit a request signal to said primary station; and the request transmitting means of each secondary station is adapted to transmit a request signal to the primary station directly following a transmission of payload data by said secondary station if it then has further data to transmit;

wherein the allocation transmitting means is adapted to transmit as an allocation signal the transmission request signals which have been received by the primary station.

2. A telecommunication network according to claim 1, wherein the request transmitting means of a secondary station is adapted to transmit the transmission request signal during a timeslot assigned to said secondary station.

3. A telecommunication network according to claim 1, wherein the payload transmitting means of each secondary station is adapted to transmit payload data during a predetermined number of symbol intervals which corresponds to an integral number of short information cells or to a single synchronous transfer mode cell.

4. A telecommunication network according to claim 3, wherein the short information cells have a duration of sixteen bytes and the number of such cell is equal to four.

5. A telecommunication network comprising a primary station and a plurality of secondary stations, the secondary stations being linked to the primary station by a transmission medium which is at least partly shared in common by the secondary stations; characterized in that:

the secondary stations each comprise request transmitting means for transmitting a transmission request signal to the primary station;

the primary station comprises allocation transmitting means for transmitting an allocation signal to each of the secondary stations from which request signals have been received;

the secondary stations each comprise payload transmitting means which, in response to an allocation signal, transmit payload data from the requesting secondary stations in respective timeslots of equal predetermined duration;

the number of said timeslots being determined by the number of secondary stations which transmit a request signal to said primary station; and the request transmitting means of each secondary station is adapted to transmit a request signal to the primary station directly following a transmission of payload data by said secondary station if it then has further data to transmit;

wherein the payload transmitting means of each secondary station is adapted to transmit payload data during a predetermined number of symbol intervals which corresponds to an integral number of short information cells or to a single synchronous transfer mode cell;

wherein the short information cells have a duration of sixteen bytes and the number of such cell is equal to four;

wherein the short information cells have a four byte header and the synchronous transfer mode cell has an additional four bytes header.

6. A telecommunication network according to claim 3, wherein the short information cells have a duration of nine bytes and the number of said cells is equal to six.

7. A telecommunication network comprising a primary station and a plurality of secondary stations, the secondary stations being linked to the primary station by a transmission medium which is at least partly shared in common by the secondary stations; characterized in that:

the secondary stations each comprise request transmitting means for transmitting a transmission request signal to the primary station;

the primary station comprises allocation transmitting means for transmitting an allocation signal to each of the secondary stations from which request signals have been received;

the secondary stations each comprise payload transmitting means which, in response to an allocation signal, transmit payload data from the requesting secondary stations in respective timeslots of equal predetermined duration;

the number of said timeslots being determined by the number of secondary stations which transmit a request signal to said primary station; and the request transmitting means of each secondary station is adapted to transmit a request signal to the primary station directly following a transmission of payload data by said secondary station if it then has further data to transmit;

wherein the payload transmitting means of each secondary station is adapted to transmit payload data during a predetermined number of symbol intervals which corresponds to an integral number of short information cells or to a single synchronous transfer mode cell;

wherein the short information cells have a duration of nine bytes and the number of said cells is equal to six;

wherein the short information cells have a one byte header and the synchronous transfer mode cell has an additional one byte header.

8. A secondary station for use in a telecommunication network wherein a plurality of secondary stations are linked to a primary station by a transmission medium which is at least partly shared in common by the secondary stations; said secondary station comprising:

request transmitting means for transmitting a transmission request signal to the primary station when said secondary station has data which is to be transmitted; and payload transmitting means responsive to an allocation signal from the primary station to transmit data thereto in a timeslot of predetermined duration, different timeslots of said duration being assigned to different secondary stations;

the number of said timeslots being determined by the number of secondary stations which transmit a request signal to said primary station;

the request transmitting means being adapted to transmit a request signal to the primary station directly following a transmission of payload data by said secondary station if it then has further data which is to be transmitted;

wherein the allocation signal from the primary station is the transmission request signals received by the primary station.

9. A secondary station according to claim 8, wherein the request transmitting means is adapted to transmit said transmission request signal during a time slot assigned to said secondary station.

10. A secondary station according to claim 8, wherein the payload transmitting means is adapted to transmit payload data during a predetermined number of symbol intervals which correspond to an integral number of short information cells or to a single synchronous transfer mode cell.

11. A primary station for use in a telecommunication network wherein a plurality of secondary stations are linked to the primary station by a transmission medium which is shared at least partly in common by the secondary stations, said primary station comprising:

request reception means for receiving transmission request signals which are transmitted by secondary stations;

allocation transmitting means for transmitting an allocation signal to each of the secondary stations from which transmission request signals have been received; and payload reception means for receiving data transmitted by the respective secondary stations in respectively corresponding payload timeslots assigned thereto, the payload timeslots being of equal predetermined duration;

the number of said payload timeslots being determined by the number of secondary stations which transmit a request signal to said primary station;

said payload reception means being adapted to receive request signals immediately after reception of payload data transmitted by the secondary stations pursuant to an allocation signal;

wherein the allocation transmitting means is adapted to retransmit as an allocation signal the transmission request signals which have been received by the primary station.

12. A communication method for use in a network comprising a primary station and a plurality of secondary stations, the secondary stations being linked to the primary station by a transmission medium which is shared at least partly in common by the secondary stations, said method comprising the steps of:

transmission during a predetermined time period of a transmission request signal from at least one secondary station to the primary station;

transmission by the primary station of an allocation signal to the secondary stations from which transmission requests signal have been received;

transmission in response to the allocation signal of payload data by the secondary stations to the primary station, the transmission from successive secondary stations being during successive time intervals of predetermined duration;

the number of said time intervals being determined by the number of secondary stations which transmit a request signal to said primary station; and transmission by each secondary station of a transmission request signal to the primary station directly after transmission of payload data by said secondary station if it still has further data to transmit;

wherein the allocation signal to the secondary stations is the transmission request signal received by the primary station.

13. A telecommunication network according to claim 2, wherein the payload transmitting means of each secondary station is adapted to transmit payload data during a predetermined number of symbol intervals which corresponds to an integral number of short information cells or to a single synchronous transfer mode cell.

14. A telecommunication network according to claim 1, wherein the payload transmitting means of each secondary station is adapted to transmit payload data during a predetermined number of symbol intervals which corresponds to an integral number of short information cells or to a single synchronous transfer mode cell.

15. A secondary station according to claim 9, wherein the payload transmitting means is adapted to transmit payload data during a predetermined number of symbol intervals which correspond to an interval number of short information cells or to a single synchronous transfer mode cell.

16. A telecommunication network comprising:

a primary station;

a plurality of secondary stations;

said secondary stations each having a request transmitter for transmitting to said primary station a request to transmit information;

an allocation signal generated by said primary station;

said allocation signal allocating time slots for each secondary station that requests to transmit information to said primary station;

said primary station defining a payload period defined by the number of secondary stations that request to transmit information and by a request period; and said request period being effective to allow said secondary stations to transmit said requests;

wherein said allocation signal is the request to transmit information from one of said secondary stations.

* * * * *